United States Patent
Lampe

(10) Patent No.: US 7,404,368 B2
(45) Date of Patent: Jul. 29, 2008

(54) METHOD FOR FORMING A BUTTONHOLE IN A FABRIC

(75) Inventor: Dominique Lampe, Roeselare (BE)

(73) Assignee: BVBA Shadow Belgium, Roeselare (BE)

( * ) Notice: Subject to any disclaimer, the term of this patent is extended or adjusted under 35 U.S.C. 154(b) by 0 days.

(21) Appl. No.: 11/447,230

(22) Filed: Jun. 5, 2006

(65) Prior Publication Data

US 2006/0272563 A1   Dec. 7, 2006

(30) Foreign Application Priority Data

Jun. 3, 2005   (BE) .................................. 2005/0280

(51) Int. Cl.
  *D05B 17/00*   (2006.01)
  *D00B 37/00*   (2006.01)

(52) U.S. Cl. ............................ 112/475.06; 112/475.08; 112/68; 83/905

(58) Field of Classification Search ............. 112/65–68, 112/475.01, 475.04, 475.06, 475.08, 475.14, 112/475.15; 219/121.19; 36/52; 83/905; 39/118, 119, 120; 160/84.02

See application file for complete search history.

(56) References Cited

U.S. PATENT DOCUMENTS

| | | | | |
|---|---|---|---|---|
| 4,157,719 A | * | 6/1979 | DeWoskin | .................. 604/402 |
| 4,860,384 A | | 8/1989 | Widenbäck | |
| 5,129,440 A | * | 7/1992 | Colson | ..................... 160/84.02 |
| 5,313,998 A | * | 5/1994 | Colson et al. | ............ 160/84.02 |
| 5,787,951 A | * | 8/1998 | Tonomura et al. | ........ 160/84.01 |
| 6,192,961 B1 | * | 2/2001 | Martinez | ..................... 160/89 |
| 6,298,798 B1 | * | 10/2001 | Nomura et al. | ............... 112/68 |
| 6,875,710 B2 | * | 4/2005 | Eaton et al. | ................... 442/66 |
| 6,960,740 B2 | * | 11/2005 | Giloh | ..................... 219/121.78 |

FOREIGN PATENT DOCUMENTS

| | | |
|---|---|---|
| AT | 339230 | 10/1977 |
| DE | 1610834 | 2/1971 |
| EP | 0073094 | 3/1983 |
| FR | 2079944 | 12/1971 |

\* cited by examiner

*Primary Examiner*—Ismael Izaguirre
(74) *Attorney, Agent, or Firm*—James Creighton Wray; Clifford D. Hyra

(57) ABSTRACT

The object of the invention is to provide a method and device with which it is possible, in a simple and rapid way, to form a buttonhole in a fabric which requires no further marking.

The object of the invention is achieved by providing a method for producing a buttonhole in a fabric, in which an opening is formed in the fabric by means of an ultrasonic welding treatment, after which the edges of this opening are fused, to form the buttonhole.

14 Claims, 2 Drawing Sheets

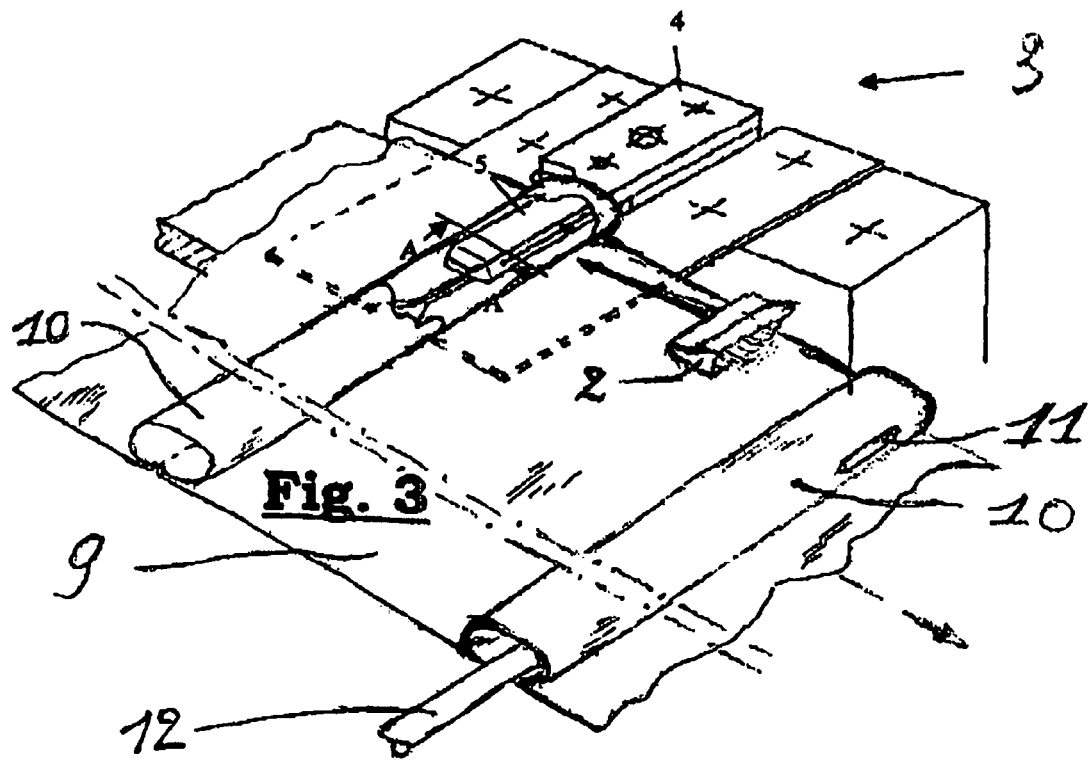
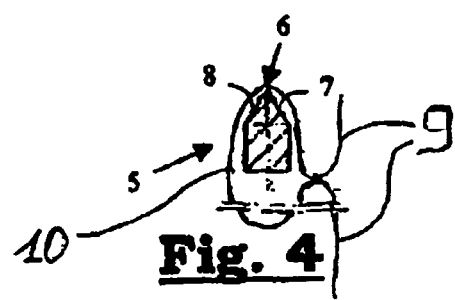

METHOD FOR FORMING A BUTTONHOLE IN A FABRIC

This application claims the benefit of Belgian Application No. 2005/0280 filed Jun. 3, 2005, which is hereby incorporated by reference in its entirety.

BACKGROUND OF THE INVENTION.

The present invention relates firstly to a method for producing a buttonhole in a fabric, in which an opening is formed in the fabric by means of an ultrasonic welding treatment, after which the edges of this opening are fused, to form the buttonhole. Secondly, the present invention also relates to a device for forming a buttonhole in a fabric.

Hitherto, there have been two known ways of forming buttonholes in a fabric. In a first way, first of all the location where the buttonhole is to be positioned and the length of the buttonhole are marked on the fabric, after which the buttonhole is stitched onto the fabric. Then, the opening of the buttonhole is formed in the stitched area. In a second way, first of all the location where the buttonhole is to be positioned and the length of the buttonhole are marked on the fabric, after which the opening is formed in the fabric by means of a knife or blade. To prevent fraying, the openings which have been formed are then stitched up at their sides.

The drawback of forming buttonholes in this way is that it is labor-intensive.

In the field of window decoration, widespread use is made of curtains, for example Roman blinds, voile curtains, lined curtains, etc. To enable curtains to hang correctly, one or more tunnels are provided in the fabric, extended over the entire width of the curtain. For example, in the case of Roman blinds, various tunnels of this type are provided over the entire height of the curtain, at the same or different distances from one another.

Reinforcements are worked into the said tunnels, for example in the form of a lead tape, reinforcing bars (or ribs), etc.

Shower curtains provided with reinforcements of this type can also be used to screen off showers.

High-quality curtains must allow the reinforcements to be removed from the curtain in a quick and simple way, so that the reinforcements can be replaced, for example when they become worn or broken or when the curtains need to be cleaned. The latter is important in particular for Roman blinds, in which primarily reinforcing rods are used.

To allow the reinforcements to be removed from the curtain in a simple way, it is known to provide a buttonhole at least one of the ends of each tunnel, preferably on the underside.

Forming buttonholes in a tunnel of a curtain in the traditional manual manner described above, i.e. by means of stitching, has the drawback that the buttonholes are not always sufficiently in the center and that the buttonholes of a plurality of tunnels are not always aligned with one another.

SUMMARY OF THE INVENTION

The object of the invention is to provide a method and device with which it is possible, in a simple and rapid way, to form a buttonhole in a fabric which requires no further marking and in which, moreover, the buttonholes are always provided at the correct position in the tunnels.

The object of the invention is achieved on the one hand by providing a method for producing a buttonhole in a fabric, in which an opening is formed in the fabric by means of an ultrasonic welding treatment, after which the edges of this opening are fused, to form the buttonhole. The invention is characterized in that first of all at least one tunnel is formed in the fabric, after which the buttonhole is formed in the said tunnel. As a result, in a quick and simple way, a buttonhole is obtained in the fabric which requires no further marking and no further stitching.

In a preferred method according to the present invention, the ultrasonic welding operation is carried out by means of an ultrasonic welding device, comprising a sonotrode and an anvil on which is arranged a mandrel, the mandrel being intended to form the opening in the fabric and to fuse the edges of the opening which has been formed.

Preferably, the mandrel is intended to extend at least part way into the said tunnel.

In a more preferred method according to the invention, a fabric which comprises 0-10% of plastics material, preferably polyester, in the composition is treated with an additive comprising plastics material before the ultrasonic welding treatment is carried out. This makes it possible for all fabrics, i.e. both those consisting entirely of cotton, natural silk, and the like, and those provided with a layer (0-10%) of plastics material (polyester) to be provided with a buttonhole using a method according to the present invention. Before the ultrasonic welding treatment is carried out, the fabric will be injected with a mixture of methyl methacrylate and propyl/glycol momenthyl. Another, more preferred way of treating fabrics of this type consists in first of all arranging a transparent strip of polyurethane, polyester or polyamide on the fabric, then carrying out the ultrasonic welding treatment.

Preferably, the said fabric is a curtain which is provided with one or more tunnels, with a reinforcement being arranged in the tunnels. More particularly, the curtain is a Roman blind, in which reinforcing rods can be arranged in one or more tunnels. On the other hand, this object of the invention is achieved by providing a device for forming a buttonhole in a fabric, the device being provided with an ultrasonic device for forming an opening in the fabric and fusing the edges of the opening which is formed, to form the buttonhole. The device according to the present invention is characterized in that the ultrasonic device is provided with a sonotrode and an anvil on which is arranged a mandrel, the mandrel being provided for the purpose of forming the opening in the fabric and fusing the edges of the opening which is formed, and in that the dimensions of the mandrel are such that it extends at least part way into a tunnel formed in the fabric.

To form the opening in the fabric, in a preferred embodiment the mandrel is provided with a top edge, and to fuse the edges of the opening which is formed, in a more preferred embodiment of the device, the mandrel is provided with two bevelled surfaces. Furthermore, the contact surface of the sonotrode is designed to be planar in a more particular embodiment. The top edge together with the bevelled surfaces, in a preferred embodiment, only extend over part of the mandrel, and furthermore the position and length of the top edge determines the position and length of the buttonhole.

The width of the mandrel matches the diameter of the tunnel and is preferably at least 15 mm.

In particular, the device is provided for the purpose of carrying out a method according to one of Claims 1 to 6.

To further clarify the properties of the present invention and to demonstrate additional advantages and details thereof, there now follows a more detailed description of the method according to the invention. It will be clear that nothing in the description which follows can be interpreted as restricting the scope of protection of the present invention as laid down by the claims.

This description refers by means of reference numerals to the accompanying drawings, in which:

BRIEF DESCRIPTION OF THE DRAWINGS

FIG. 3 shows a view of the anvil, provided with a mandrel, of the ultrasonic welding device;

FIG. 4 shows a cross section through the mandrel on line A-A.

DETAILED DESCRIPTION OF THE PREFERRED EMBODIMENTS

Figure 1:
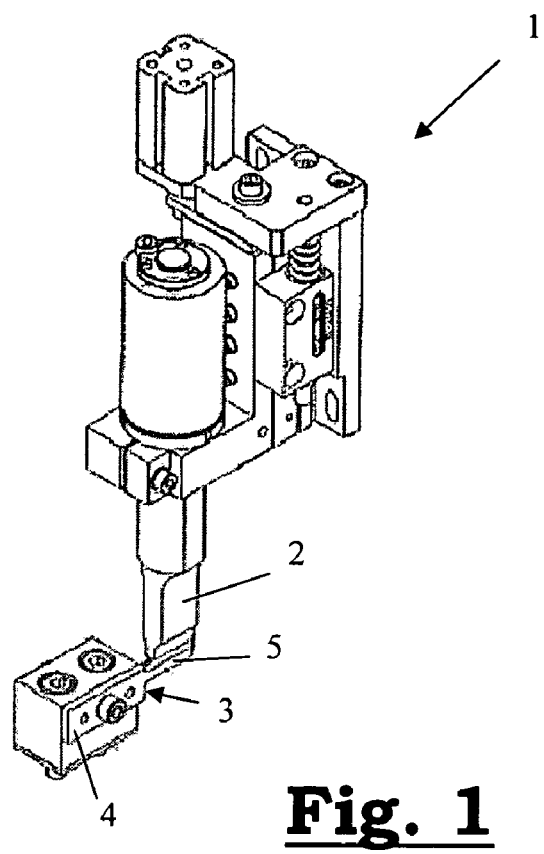
FIG. 1 shows a perspective view of an ultrasonic welding device for forming a buttonhole in a tunnel of a Roman blind.

Curtains have to have the option of removing the reinforcements (12), such as for example the reinforcing rods, from the curtain (2) in a simple and rapid way.

To remove the abovementioned reinforcing rods (12) from the curtain (2) in a simple way, it is known to provide a buttonhole (11) at leas one of the ends of each tunnel (19), preferably on the underside. With the method and device according to the invention, it is now possible, in a fast and simple way, to form a buttonhole (11) in a fabric (9), preferably a curtain provided with one or more tunnels (10) which extend over the entire width of the curtain.

Figure 2:
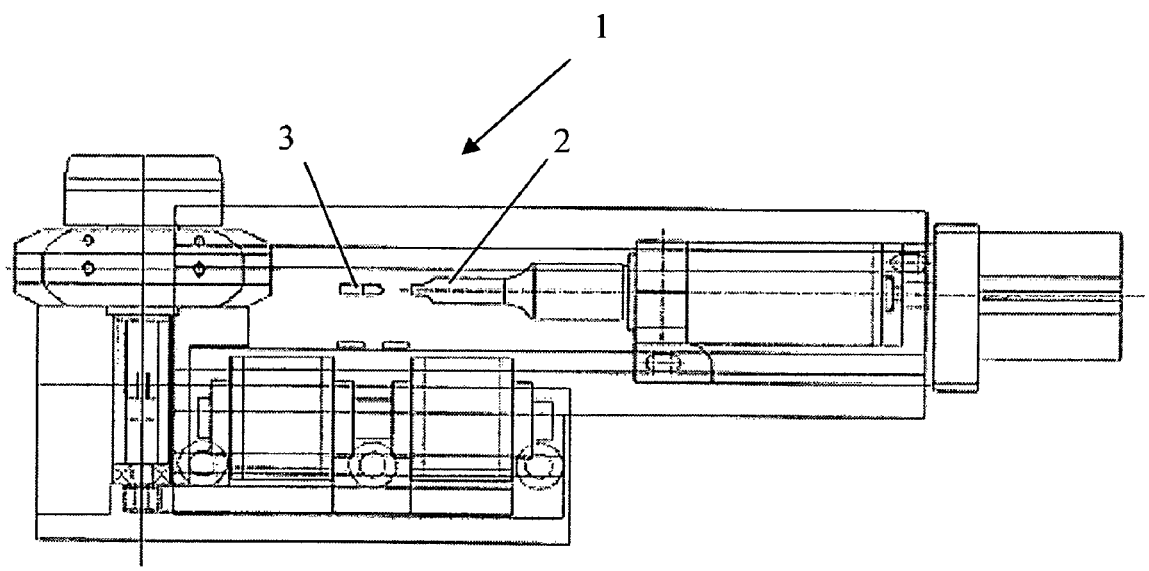
FIG. 2 shows a cross section through an ultrasonic welding device.

In the method according to the invention, an opening is formed in the fabric by means of an ultrasonic welding treatment, after which the edges of this opening are fused in order to form the buttonhole. The ultrasonic welding treatment is carried out by means of an ultrasonic welding device (1) as illustrated in FIGS. 1 and 2.

During ultrasonic welding, the mains voltage of 220 V and 50/60 Hz is converted into an AC voltage of the desired frequency (for example 20000 Hz). This AC voltage is supplied to a converter (vibratory element), which converts the electrical wave into a mechanical vibration. To transmit the vibrations, the ultrasonic welding device (1) comprises a sonotrode. Furthermore, the welding device (1) also comprises an anvil (3) on which is arranged a mandrel (5). The mandrel (5), as illustrated in FIGS. 1 and 3, is positioned on a support piece (4) of the anvil (3).

The mandrel (5) is provided for the purpose of forming the opening in the fabric (2) and fusing the edges of the opening which is formed. To form the opening in the fabric (9), the mandrel (5) is provided with a top edge (6), and to fuse the edges of the opening which is formed, the mandrel (5) is provided with two bevelled surfaces (7, 8).

In order now to make a buttonhole in a tunnel of a curtain, the mandrel (5) of the welding device (1) is positioned in the tunnel of the curtain, the width of the mandrel (5) corresponding to the diameter of the tunnel. Then, the sonotrode slides on to the fabric of the curtain. When the planar contact surface of the sonotrode touches the fabric, the latter is pressed against the top edge (6). Heat is generated and an opening will be formed with a length corresponding to the length (L) of the top edge (6). The sonotrode (3) slides onwards and will press the edges of the opening which is formed on to the two bevelled surfaces (7, 8), with the result that the edges are fused. Once the edges are fused, the sonotrode will move back upwards.

The invention claimed is:

1. Method for producing a buttonhole in a fabric, in which an opening is formed in the fabric by means of an ultrasonic welding treatment, after which the edges of this opening are fused, to form the buttonhole, characterized in that first of all at least one tunnel is formed in the fabric, after which the buttonhole is formed in the said tunnel.

2. Method according to claim 1, characterized in that the ultrasonic welding operation is carried out by means of an ultrasonic welding device (1), comprising a sonotrode (2) and an anvil (3) on which is arranged a mandrel (5), the mandrel (5) forming the opening in the fabric and fusing the edges of the opening which has been formed.

3. Method according to claim 2, characterized in that the mandrel (5) extends at least part way into the said tunnel.

4. Method according to claim 1, characterized in that a fabric which comprises 0-10% of plastics material in the composition is treated with an additive comprising plastics material before the ultrasonic welding treatment is carried out.

5. Method for producing a buttonhole in a fabric, in which an opening is formed in the fabric by means of an ultrasonic welding treatment, after which the edges of this opening are fused, to form the buttonhole, characterized in that first of all at least one tunnel is formed in the fabric, after which the buttonhole is formed in the said tunnel, wherein the fabric is a curtain which is provided with one or more tunnels, and arranging a reinforcement in the tunnels.

6. Method according to claim 5, characterized in that the curtain is a Roman blind, in which reinforcing rods are arranged in one or more tunnels.

7. Device for forming a buttonhole in a fabric, the device being provided with an ultrasonic device (1) for forming an opening in the fabric and fusing the edges of the opening which is formed, to form the buttonhole, characterized in that the ultrasonic device (1) is provided with a sonotrode (2) and an anvil (3) on which is arranged a mandrel (5), the mandrel (5) being provided for the purpose of forming the opening in the fabric and fusing the edges of the opening which is formed, and in that the dimensions of the mandrel (5) are such that it extends at least part way into a tunnel formed in the fabric.

8. Device according to claim 7, characterized in that the mandrel (5) is provided with a top edge (6) for forming the opening in the tunnel formed in the fabric.

9. Device according to claim 7, characterized in that the mandrel (5) is provided with two bevelled surfaces (7, 8) for fusing the edges of the opening which is formed.

10. Ultrasonic welding device according to claim 7, characterized in that the contact surface of the sonotrode (2) is designed to be planar.

11. Method for producing a buttonhole in a fabric, in which an opening is formed in the fabric by means of an ultrasonic welding treatment, after which the edges of this opening are fused, to form the buttonhole, wherein first of all at least one tunnel is formed in the fabric, after which the buttonhole is formed in the said tunnel, wherein the ultrasonic welding operation is carried out by means of an ultrasonic welding device, comprising a sonotrode and an anvil on which is arranged a mandrel, wherein the mandrel extends at least part way into the tunnel and the mandrel is used to form the opening in the fabric and to fuse the edges of the opening which has been formed.

12. Method according to claim 11, wherein a fabric which comprises 0-10% of plastics material in the composition is treated with an additive comprising plastics material before the ultrasonic welding treatment is carried out.

13. Method according to claim 11, wherein the said fabric is a curtain which is provided with one or more tunnels, with a reinforcement being arranged in the tunnels.

14. Method according to claim 13, characterized in that the curtain is a Roman blind, in which reinforcing rods are arranged in one or more tunnels.

* * * * *